United States Patent [19]

Igashira et al.

[11] 4,261,318
[45] Apr. 14, 1981

[54] IGNITION SYSTEM FOR ENGINES

[75] Inventors: Toshihiko Igashira, Toyokawa; Hisasi Kawai, Toyohashi; Seiji Morino; Hitoshi Kanmura, both of Okazaki, all of Japan

[73] Assignee: Nippon Soken, Inc., Nishio, Japan

[21] Appl. No.: 36,164

[22] Filed: May 4, 1979

[30] Foreign Application Priority Data

Jul. 27, 1978 [JP] Japan .................... 53-92277

[51] Int. Cl.³ ............................... F02P 1/00
[52] U.S. Cl. .................... 123/606; 123/625; 123/416; 123/418; 123/628
[58] Field of Search ........... 123/117 R, 117 D, 148 E

[56] References Cited

U.S. PATENT DOCUMENTS

| 3,926,557 | 12/1975 | Callies | 123/148 E |
| 3,945,362 | 3/1976 | Neuman | 123/148 E |
| 3,976,043 | 8/1976 | Canup | 123/148 E |
| 4,009,699 | 3/1977 | Hetzlek | 123/117 D |
| 4,091,787 | 5/1978 | Frank | 123/148 E |

Primary Examiner—Ronald B. Cox
Attorney, Agent, or Firm—Cushman, Darby & Cushman

[57] ABSTRACT

An engine ignition system includes a throttle sensor for detecting the position of a throttle valve. A control circuit is responsive to the detected throttle signal as well as the signals from other negative pressure and engine rpm sensors to generate a spark plug discharge start signal and a discharge stop signal. A high voltage generator supplies a high voltage to the respective spark plugs during the time interval between the time that the discharge start signal is generated and the time that the discharge stop signal is generated.

10 Claims, 10 Drawing Figures

IGNITION SYSTEM FOR ENGINES

BACKGROUND OF THE INVENTION

The present invention relates to ignition systems for spark-ignition engines, and more particularly the invention relates to an ignition system capable of causing the spark plugs to discharge continuously.

The ignition system of a conventional spark-ignition engine comprises an ignition coil, a circuit breaker, etc., and it is so designed that the primary current flowing in the primary winding of the ignition coil is interrupted by the circuit breaker to generate a high voltage instantaneously in the secondary winding of the ignition coil and the high voltage is applied to the proper spark plug, thus instantaneously causing a capacitance discharge and thereby producing a single spark to ignite the mixture in the cylinder.

In recent years, to meet the restrictions on exhaust emissions and requirement for improved fuel consumption, engines have come into use in which leaner mixtures are used or a large quantity of exhaust gas recirculation (EGR) is used. However, the use of the previously mentioned known ignition system in these engines tended, due to the discharge period of the spark plugs being instantaneous, to cause misfiring due to the insufficient ignition energy and hence unsatisfactory ignition of the mixture and also to cause uneven combustions due to the unstable combustion.

SUMMARY OF THE INVENTION

With a view to overcoming the foregoing deficiencies, it is an object of the invention to provide an ignition system in which the mixture can be ignited positively to prevent the occurrence of misfiring and the combustion can be made stable to prevent the occurrence of uneven combustion.

It is another object of the invention to provide an ignition system which is capable of reducing waste of electric power and wear of the spark plugs.

DESCRIPTION OF THE PREFERRED EMBODIMENT

The present invention will now be described in greater detail with reference to the illustrated embodiment.

Figure 1:
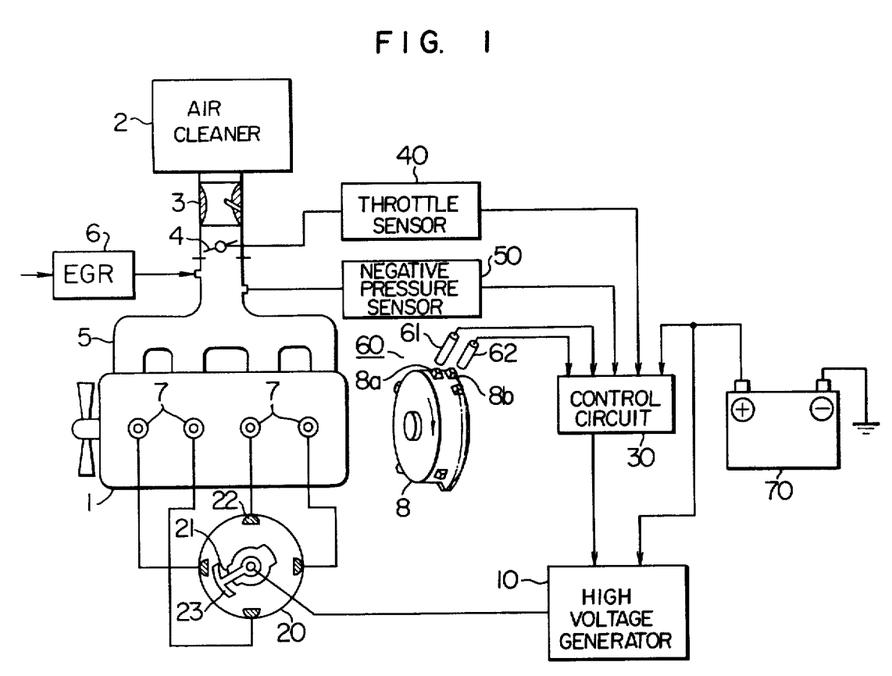
FIG. 1 is a schematic block diagram showing the overall construction of an embodiment of the present invention.

Referring to FIG. 1 showing the overall construction of the embodiment, an engine 1 is a known type of four-cylinder, four-cycle engine in which the required air for combustion is supplied through an air cleaner 2, a carburetor 3, a throttle valve 4 and an intake pipe 5 and the exhaust gases produced by the combustion are discharged through an exhaust pipe (not shown). A part of the exhaust gases is recirculated to the intake pipe 5 through a known type of exhaust gas recirculation (EGR) control valve 6.

The engine 1 is of the spark-ignition type in which conventional spark plugs 7 are mounted in the respective cylinders and a magnetic disk 8 is coupled to the engine crankshaft (not shown) to make one rotation for every two rotations of the crankshaft in synchronism with the rotation thereof. The magnetic disk 8 is made of a magnetic material such as iron and it is formed with four (4) reference teeth 8a and forty (40) teeth 8b which are arranged over the entire periphery of the magnetic disk.

Referring now to the ignition system, it comprises a high voltage generator 10, a distributor 20 for distributing a high voltage to the spark plugs 7 in the respective cylinders, a control circuit 30 for controlling the high voltage generator 10, a throttle sensor 40, a negative pressure sensor 50, a crank angle sensor 60 and a power source 70 such as a battery.

Figure 2:
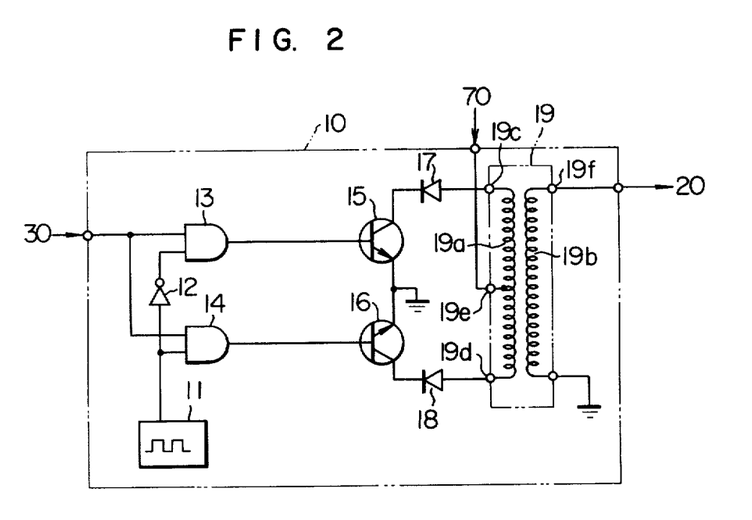
FIG. 2 is a circuit diagram of the high voltage generator shown in FIG. 1.

The high voltage generator 10 generates a high voltage periodically and it comprises, as shown in FIG. 2, an oscillator circuit 11, an inverter 12, AND gates 13 and 14, transistors 15 and 16, diodes 17 and 18 and a transformer 19. The oscillator circuit 11 comprises a known type of astable multivibrator and it generates rectangular pulses of about 10 KHz. The rectangular pulses are applied to the AND gate 13 through the inverter 12 and they are also applied directly to the other AND gate 14, thus applying to the AND gates 13 and 14 the pulses which are opposite in phase. Each of the AND gates 13 and 14 also receives a control signal from the control circuit 30.

The transistors 15 and 16 have their bases respectively connected to the output terminal of the AND gates 13 and 14, their emitters grounded and their collectors respectively connected through the diodes 17 and 18 to the transformer 19.

The transformer 19 includes a primary coil 19a and a secondary coil 19b having a turns ratio of about 100:1 so that a pulse voltage applied to the primary coil 19a is stepped up and generated from the secondary coil 19b, and the primary coil 19a has its terminals 19c and 19d respectively connected to the anodes of the diodes 17 and 18 and its center terminal 19e connected to the positive terminal of the power source 70.

The secondary coil 19b has its terminal 19f connected to a rotary electrode 21 of the distributor 20. Thus the high voltage generator 10 generates a high voltage continuously in response to a "1" level control signal applied from the control circuit 30.

The distributor 20 rotates in synchronism with the rotation of the crankshaft of the engine 1 and it includes the rotary electrode 21 which rotates once for every two rotations of the crankshaft and four fixed electrodes 22 which are arranged at equal spaces. The rotary electrode 21 and the fixed electrodes 22 are arranged to be opposite one another with an air gap of about 0.2 mm therebetween.

The rotary electrode 21 includes a brush portion 23 having an arc of about 60 degrees and the rotary electrode 21 is connected to the high voltage generator 10. The fixed electrodes 22 are each connected to one of the spark plugs 7 in the respective cylinders.

The throttle sensor 40 comprises a known type of potentiometer or the like and it generates a detection signal corresponding to the position of the throttle valve 4.

The negative pressure sensor 50 comprises a known type of semiconductor pressure sensor and it generates a detection signal corresponding to the negative pressure in the intake pipe 5.

The crank angle sensor 60 comprises electromagnetic pickups 61 and 62 of which the electromagnetic pickup 61 is disposed to detect the position of the four reference teeth 8a provided on the magnetic disk 8 in relation to the position of the number one piston, i.e., 170 degrees before its top dead center (BTDC) on the compression stroke, and the other electromagnetic pickup 62 is disposed to detect the position of the teeth 8b which are arranged by dividing the entire periphery of the magnetic disk 8 into forty (40) equal parts.

The control circuit 30 receives as its inputs the detection signals from the throttle sensor 40, the negative pressure sensor 50 and the electromagnetic pickups 61 and 62 of the crank angle sensor 60 and in response to these input signals it generates a control signal to control the timing of generation of a high voltage from the high voltage generator 10.

The control circuit 30 computes the time (as a function of crank angle) to start discharging the spark plug 7 of each cylinder from the following equations:

$$\theta_s = \theta_N + \theta_V + \theta_T + \theta_d \quad (1)$$
$$= a \cdot N + b \cdot N + c \cdot (1 - T) + d \quad (2)$$

Where $\theta_s$ = crank angle at which the discharge is started and it is given in terms of degrees BTDC N = engine rotational speed (rpm)

V = negative pressure in the intake pipe 5

Figure 3:
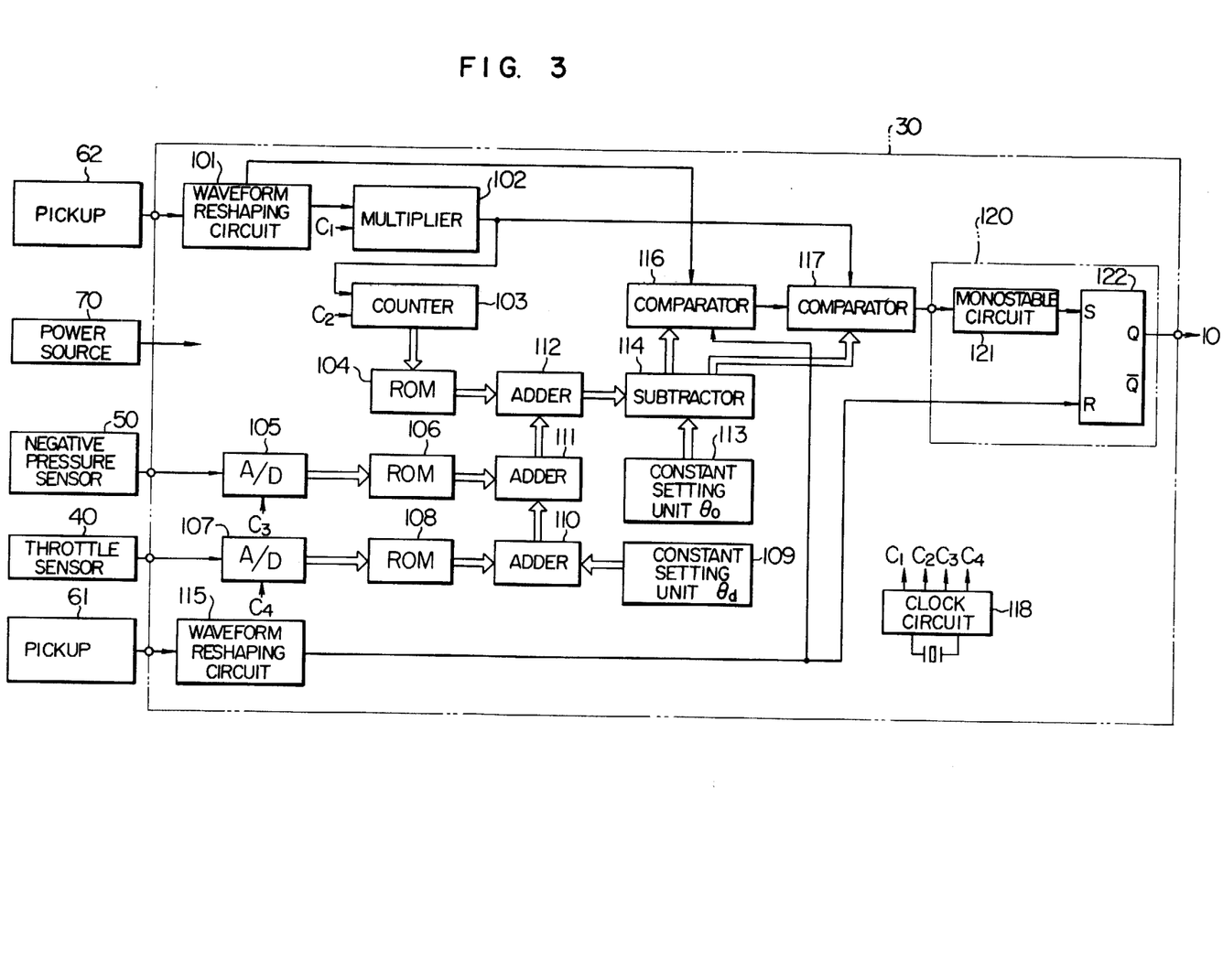
FIG. 3 is a block diagram for the control circuit shown in FIG. 1.

T = opening of the throttle valve 4 which will be less than 1 for openings smaller than a predetermined value but 1 for openings greater than the predetermined value a,b,c,d = constants The control circuit 30 also sets the time to stop discharge to 10° crank angle after top dead center (ATDC) of each cylinder; that is, to 170 degrees BTDC on the compression stroke which is indicated by each reference tooth 8a, and the circuit will be described in detail with reference to the block diagram of FIG. 3.

In the Figure, a waveform reshaping circuit 101 generates a rectangular pulse signal by reshaping the distorted wave signal generated from the electromagnetic pickup 62 when it is opposite to the tooth 8b.

A frequency multiplier circuit 102 increases by 32 times the frequency of the output pulse signals of the waveform reshaping circuit 101 to convert them to high frequency pulse signals, that is, the period of the applied pulse signals is measured by means of clock pulse signals $C_1$ and the period is divided by a factor of 32 to effect the desired frequency multiplication.

A counter circuit 103 counts the output pulse signals of the frequency multiplier circuit 102 and clock pulse signals $C_2$ to compute the rotational speed of the engine 1 and the result of its computation is generated in the form of a binary digital signal.

Figure 4A:
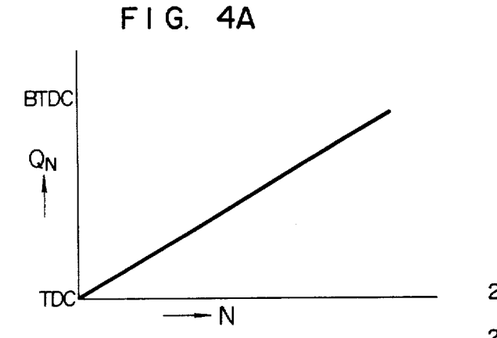
FIGS. 4A to 4C are graphs which are useful in explaining the operation of the embodiment.

A read-only memory 104 (hereinafter referred to as an ROM) receives the output of the counter circuit 103 as its input address, and the advance angles $\theta_N$ determined in relation to the engine speeds N according to an equation $\theta_N = a \cdot N$ or a characteristic such as shown in FIG. 4A are preliminarily programmed into the ROM 104 to generate the proper advance angle $\theta_N$ corresponding to the engine speed N in the form of a binary digital signal.

Although not shown in detail, the semiconductor negative pressure sensor 50 includes four resistive elements forming a bridge which generates an analog voltage corresponding to the intake vacuum V and the analog voltage is applied to an A/D converter 105.

The A/D converter 105 converts the applied analog voltage to a binary digital signal by means of clock pulse signals $C_3$ and it comprises a latch (memory) circuit, etc.

Figure 4B:
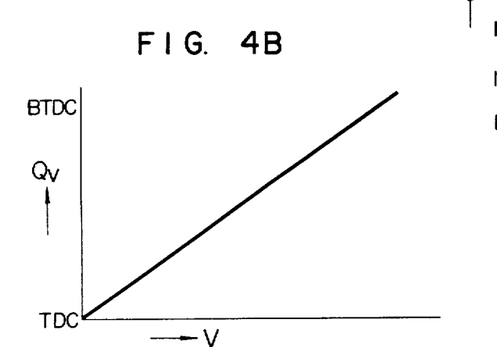

An ROM 106 receives the output of the A/D converter 105 as its input address, and the advance angles $\theta_V$ determined in relation to the intake negative pressures V according to an equation $\theta_V = b \cdot N$ or a characteristic such as shown in FIG. 4B are preliminarily programmed into the ROM 106 to generate the proper advance angle $\theta_V$ corresponding to the intake negative pressure V in the form of a binary digital signal.

The throttle sensor 40 comprises a potentiometer to generate an analog voltage corresponding to the opening of the throttle valve 4 and its output signal is applied to an A/D converter 107.

The A/D converter 107 converts the applied analog voltage to a binary digital signal by means of clock pulse signals $C_4$ and it comprises a latch (memory) circuit, etc., as in the case of the A/D converter 105.

Figures 4C, 7:
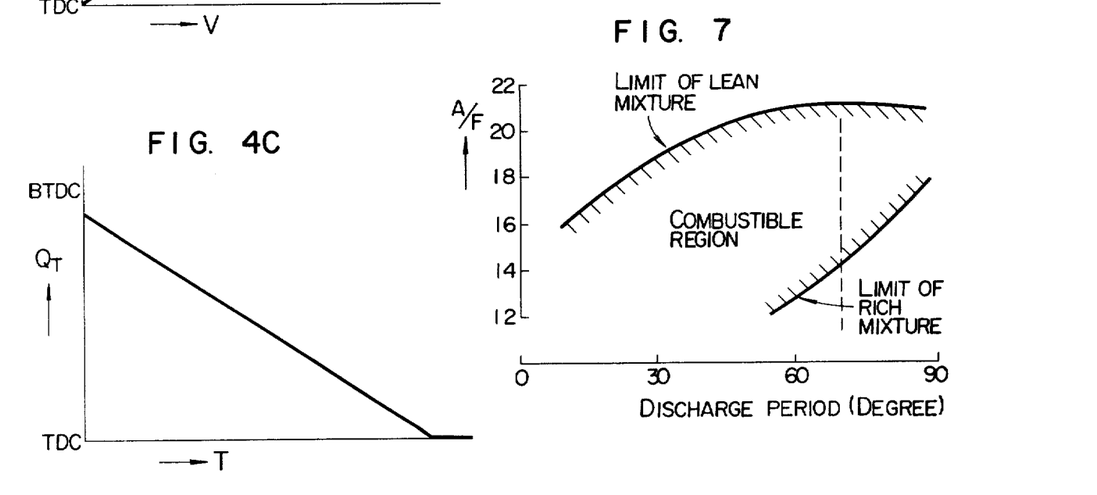
FIGS. 6 to 10 are graphs which are useful in explaining the operation of the embodiment.

An ROM 108 receives the output of the A/D converter 107 as its input address, and the advance angles $\theta_T$ determined in relation to the throttle valve openings T according to an equation $\theta_T = C \cdot (1 - T)$ or a characteristic such as shown in FIG. 4C are preliminarily programmed into the ROM 108 to generate the proper advance angle $\theta_T$ corresponding to the throttle valve opening T in the form of a binary digital signal.

A constant setting unit 109 is designed so that an advance angle $\theta_d$ preset to a fixed value d is generated in the form of a binary digital signal and it comprises for example a known type of digital switch.

Parallel adders 110, 111 and 112 are each designed to parallely add its two binary input values and generate the resulting sum in the form of an 8-bit binary digital signal, that is, the adder 110 performs the addition of $\theta_T + \theta_d$, the adder 111 the addition of $\theta_V + (\theta_T + \theta_d)$ and the adder 112 the addition of $\theta_N + (\theta_V + \theta_T + \theta_d)$. Thus the adder 112 generates an advance angle indicative of the desired discharge start time $\theta_s (= \theta_N + \theta_V + \theta_T + \theta_d)$.

A constant setting unit 113 generates a reference angle $\theta_0$ preset to a fixed value, e.g., 170 degrees in the form of a binary digital signal and it is the same in construction as the constant setting unit 109.

A parallel subtractor 114 is designed to parallel subtract one input value from the other input value and generate the resulting difference in the form of a 9-bit binary digital signal, and more specifically it performs the operation of $\theta_0 - \theta_s$. Thus the time $\theta_s$ which was computed as the desired advance angle in relation to the reference position or TDC, is converted to a retard angle $\theta_R$ in relation to another reference position or 170 degrees BTDC.

A waveform reshaping circuit 115 is designed so that a distorted wave signal generated from the electromagnetic pickup 61 when it is opposite to one of the reference teeth 8a, is reshaped and converted to a rectangular pulse signal. The number of reference teeth 8a is four (4) and they are each disposed to correspond to the crank angle position of 170° BTDC for each cylinder and the output pulse signal of the waveform reshaping circuit 115 represents 170 degrees BTDC.

Comparators 116 and 117 are each designed to digitally compare a preset value with an input value. The comparator 116 is reset by the output signal of the waveform reshaping circuit 115 and the comparator 117 is reset by the output signal of the comparator 116. In other words, the comparator 116 initiates its comparison operation in response to the reset signal so that when the number of output pulses of the waveform reshaping circuit 101 attains the output data of the subtractor 114, a "1" level signal is generated and the "1" level signal resets the comparator 117. In response to its resetting the comparator 117 starts its comparison operation and it generates a "1" level signal when the number of output pulses of the frequency multiplier circuit 102 attains the output data of the subtractor 114.

The comparator 116 receives the higher position 4 bits in the 9-bit binary output of the subtractor 114 and the remaining lower position 5 bits are applied to the comparator 117.

A pulse width setting circuit 120 comprises a monostable circuit 121 and an R-S flip-flop 122, whereby when the comparator 117 generates a "1" level signal, the set terminal S of the R-S flip-flop 122 is triggered and a "1" level signal is generated from its Q terminal, and when the waveform reshaping circuit 115 generates a "1" level signal, the reset terminal R of the R-S flip-flop 122 is triggered and the output at the Q terminal is reset to the "0" level.

A clock circuit 118 is of the crystal oscillator type and it generates the clock pulse signals $C_1$ to $C_4$ of a fixed frequency.

Although not shown, the counter circuit 103 comprises a counter for counting the output pulse signals of the frequency multiplier circuit 102 passed during a predetermined gating time, a latch circuit for temporarily storing the count value of the counter to select one of the addresses of the ROM 104 by means of a binary digital signal and a signal generator responsive to the clock pulse signals $C_2$ to generate the gating time signal, counter reset signal and latch signal for the latch circuit.

The A/D counter 105 comprises a counter for counting the clock pulse signals $C_3$, a latch circuit for temporarily storing the count value of the counter, a signal generator for generating a counter reset signal at a predetermined period, a comparator for comparing two input voltages analogically and a D/A converter for generating an analog voltage corresponding to the count value of the counter. Thus, the analog output voltage of the negative pressure sensor 50 corresponding to the intake vacuum V is compared with the output voltage of the D/A converter so that when the equality is found between the two voltages thus causing the comparator to generate a "1" level signal, that is, when the output of the counter attains a value corresponding to the detected intake vacuum V, the "1" level signal from the comparator is applied as a latch signal to the latch circuit and the then current count value of the counter is stored in the latch circuit which in turn generates a binary digital output signal to select one of the addresses in the ROM 106.

The A/D converter 107 is the same in construction with the A/D converter 105 and will not be described.

Figure 5:
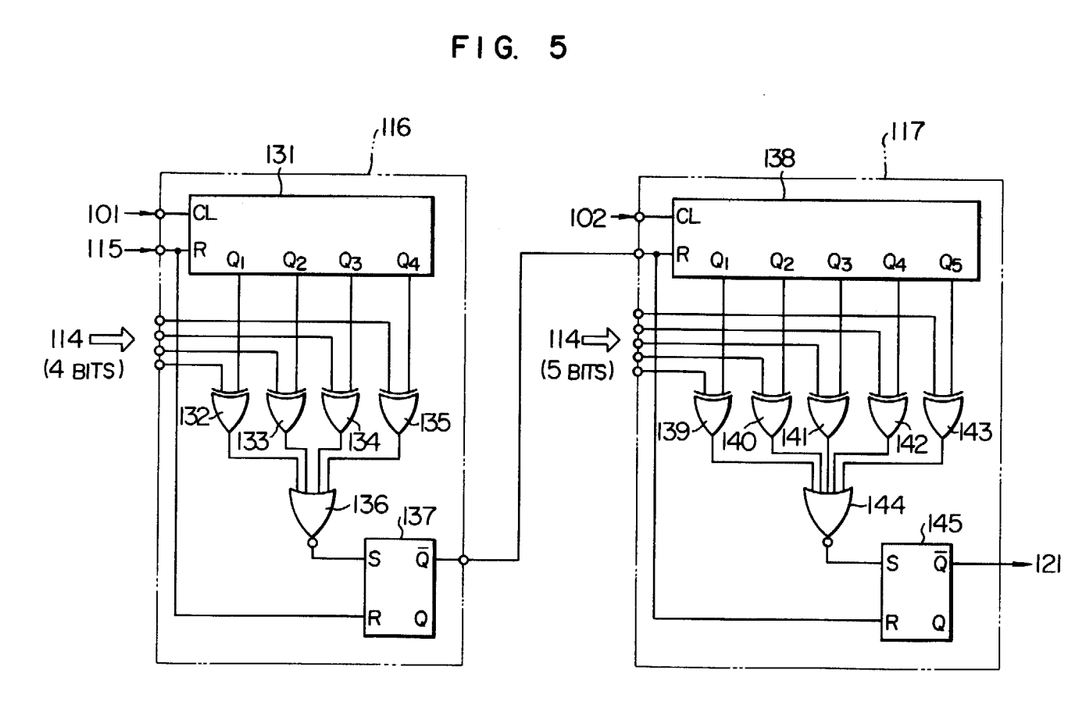
FIG. 5 is a circuit diagram of the comparators shown in FIG. 3.

The comparators 116 and 117 are constructed as shown in FIG. 5, that is, the comparator 116 comprises a binary counter 131, EXCLUSIVE OR gates 132 to 135, a NOR gate 136 and an R-S flip-flop 137, and the comparator 117 comprises a binary counter 138, EXCLUSIVE OR gates 139 to 143, a NOR gate 144 and an R-S flip-flop 145.

In the comparator 116, when the binary counter 131 and the R-S flip-flop 137 are reset by the reset signal from the waveform reshaping circuit 115, the binary counter 137 counts the number of angle signals from the waveform reshaping circuit 101. Each pulse of the angle signals corresponds to 18° in terms of crank angle degrees. When the count value becomes equal to a binary digital signal represented by the higher 4 bits in the output of the subtractor 114, the R-S flip-flop 137 is set. The time interval between the time that the R-S flip-flop 137 is reset and the time that it is set or the time that the output signal at its Q output terminal goes to the "1" level, is proportional to the higher position 4 bits in the output binary code of the subtractor 114.

What is important here is the fact that the time when the output signal from the $\overline{Q}$ output terminal of the R-S flip-flop 137 goes from the "1" to "0" level corresponds to the retard angle represented by the higher position 4 bits in the output of the subtractor 114. Since the input clocks to the comparator 116 is the output of the waveform reshaping circuit 101 which represents a crank angle itself, even if the crankshaft speed is changed in the course of the counting, the change is directly reflected in the count. The comparator 117 is identical in circuit construction with the comparator 116 except that the number of EXCLUSIVE OR gates differs depending on the number of input bits. However, its input clock pulses are the output signals of the frequency multiplier circuit 102, that is, the time interval between the pulses from the waveform reshaping circuit 101 is divided into 32 equal parts and 32 clock pulses are applied in the time interval. The lower position 5 bits in the output of the subtractor 114 is applied as an input data to the comparator 117.

When the output signal of the comparator 116 goes from the "1" to "0" level, the counter 138 of the comparator 117 starts its counting so that when the number of clock pulses attains the lower 5-bit output of the subtractor 114 representing a retard angle, the output of the comparator 117 goes from the "1" to "0" level. Each input clock pulse corresponds to $18° \div 32 = 0.56°$ in terms of crank angle degrees. As a result, the same function is provided as if the number of teeth on the disk 8 of the crank angle sensor 60 is $40 \times 32 = 1280$. Thus, the time that the output of the comparator 117 goes from the "1" to "0" corresponds to the time to start a discharge and the thus generated discharge start signal is applied to the pulse width setting circuit 120. Consequently, the monostable circuit 121 triggers the set terminal S of the flip-flop 122 which in turn generates a "1" level signal from its Q terminal.

Thereafter, when the waveform reshaping circuit 115 again generates a "1" level signal, the reset terminal R of the flip-flop 122 is triggered and the output at its Q terminal goes from the "1" level to the "0" level. And the high voltage generator 10 operates so long as the "1" level signal is being generated from the Q terminal.

The power source 70 supplies the power to the individual circuits.

With the construction described above, the air-fuel mixture containing a large quantity of recirculated exhaust gas is introduced through the intake pipe 5 into the combustion chamber of each cylinder of the engine 1 on the intake stroke.

When the piston which is not shown moves from the intake stroke to the compression stroke so that the degrees of crankshaft rotation reaches the discharge start time $\theta_s$ computed by the control circuit 30, the control circuit 30 applies a "1" level signal to the high voltage generator 10 which in turn starts generating a high voltage.

In the distributor 20 the rotary electrode 23 is opposite to one of the fixed electrodes 22 which is connected to the spark plug 7 of the cylinder on the compression stroke and the high voltage generated by the high voltage generator 10 is applied to the spark plug 7 through the distributor 20, thus causing the spark plug 7 to start a spark discharge and thereby to ignite the mixture in the cylinder.

When the piston moves from the compression stroke to the explosion stroke so that the crankshaft travels to 10 degrees ATDC (corresponding to 170 degrees BTDC for the next cylinder), the output signal of the control circuit 30 goes from the "1" level to the "0" level and the discharge of the spark plug 7 in this particular cylinder is terminated. Thereafter, the process is repeated and the high voltage is applied to the spark plugs 7 in all the cylinders by the time that the crankshaft of the engine 1 completes two revolutions (720 degrees).

The discharge start time $\theta_s$ is varied by the control circuit 30 in response to the value of the engine rotational speed N, the intake negative pressure V and the throttle valve opening T in accordance with the equation (2) and consequently the discharge period from the discharge start time until the discharge stop time is also varied.

For instance, when the engine is idling at the speed of 600 rpm, the control circuit 30 changes or sets the discharge start time $\theta_s$ to 110 degrees BTDC in response to the output signals of the throttle sensor 40, the negative pressure sensor 50 and the crank angle sensor 60 and the discharge period is set to 120° in terms of crank angle degrees. Under a low load operation where the engine speed is 1500 rpm and the intake vacuum is 300 mmHg, the discharge start time $\theta_s$ is set to 60 degrees BTDC and the discharge period is set to 70° in terms of crank angle degrees. Under an intermediate load operation where the engine speed is 2000 rpm and the intake vacuum is 200 mmHg, the discharge start time $\theta_s$ is set to 35 degrees BTDC and the discharge period is set to 45° crank angle. The discharge stop time is preset to a fixed angle of 10 degrees ATDC under all the engine operating conditions.

Figure 6:
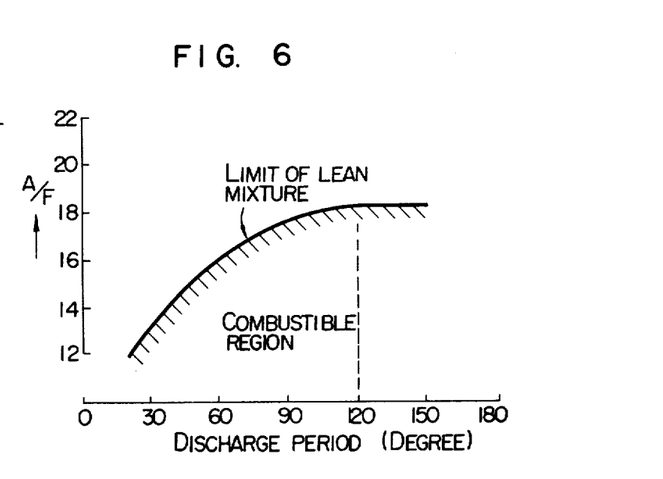
Figure 8:
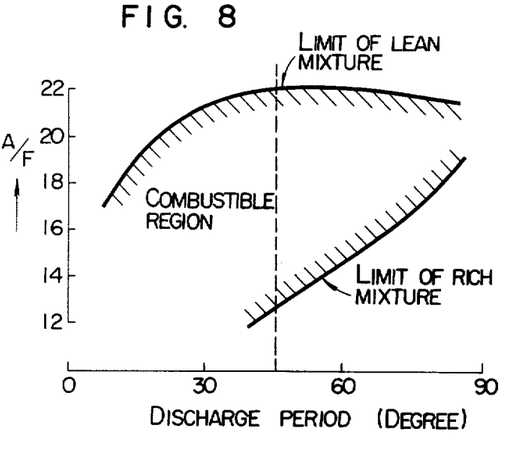

While, under the idling operation of the engine 1, the combustible region of mixtures is determined in accordance with the discharge period and the air/fuel ratio A/F as shown in FIG. 6, in accordance with the invention the discharge period is set to 120 degrees and consequently even a lean mixture having an A/F ratio of 18:1 can be ignited positively. Under the low load operation and intermediate load operation of the engine 1, the corresponding discharge periods are set to 70° and 45°, respectively and consequently even mixtures having A/F ratios of 21:1 and 22:1 can fall within the combustible region so as to be ignited positively as shown in FIG. 7 (low load operation) and FIG. 8 (intermediate load operation), respectively.

Each of the above-mentioned discharge periods represents the optimum preset value, so that if the discharge period is selected lower than the preset value the combustible region will be decreased considerably, and if the discharge period is selected higher than the preset value only the electric power will be consumed wastefully without any increase in the combustible region. In this way, it is possible to prevent waste of electric power and wear of the spark plugs and also ensure improved ignition capacity. Thus, it is possible to prevent any misfiring of the engine 1 and also ensure stable combustion.

These optimum discharge periods are applicable only to the normal operating conditions where the engine is operated with leaner mixtures or a large quantity of exhaust gas recirculation (EGR), and consequently the requirements for discharge periods are different than previously under high load operation where the engine is operated with richer mixtures and also the quantity of EGR is decreased by giving priority to the power output. In this case, the conditions which make the ignition difficult are eliminated and the ignition can take place at the same time as the start of discharge. Thus the relationship between the discharge period and the torque of the engine 1 has an important meaning.

Figure 9:
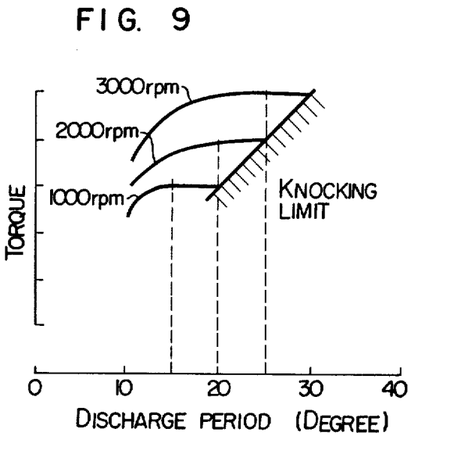

FIG. 9 shows the relationship between the discharge period and the torque under high load operation (the full-open throttle valve). The air-fuel ratio A/F is set to a fixed value of 13:1 and the discharge stop time is also preset to a fixed angle of 10 degrees ATDC.

The control circuit 30 is designed so that the discharge period is set to 15 degrees when the engine speed N is 1000 rpm, the discharge period is set to 20 degrees at 2000 rpm and the discharge period is set to 25 degrees at 3000 rpm. In this way, as shown in FIG. 9, the engine 1 is operated with the maximum torque (output) and the engine is prevented from failing to operate due to knocking.

Figure 10:
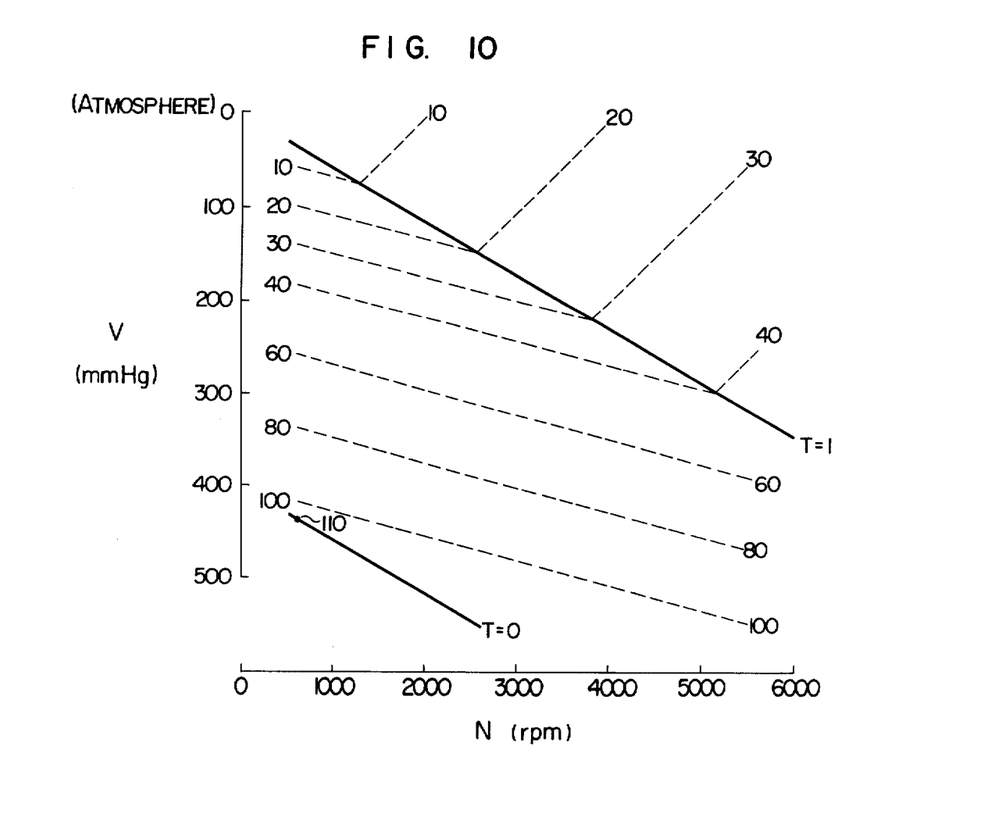

The above-mentioned experimental results are shown altogether in FIG. 10 in which each broken line indicates the plotted same discharge start time $\theta_s$ and the numerals at the ends of each broken line indicate the discharge start time $\theta_s$. Thus, in accordance with FIG. 10, the discharge start time $\theta_s$ is controlled properly in a wide range of 100 (110) to 10 degrees BTDC in response to the engine speed N, the intake vacuum V and the throttle valve opening T, thus positively igniting the mixtures.

While, in the embodiment described above, the crank angle sensor comprises the electromagnetic pickups and the magnetic disk, it is possible to use any other crank angle sensor of the type employing Hall elements or phototransistors.

We claim:

1. An ignition system for an engine having a throttle valve, an intake pipe and at least one spark plug comprising:
   crank angle sensor means for detecting crank angles of said engine;
   engine condition sensor means for detecting an operating condition of said engine;
   a control circuit, responsive to detection signals from said crank angle sensor means and said engine condition sensor means, for determining a discharge start time for said spark plug, and for setting a discharge stop time of said spark plug corresponding to a predetermined crank angle, said control circuit generating a first control signal indicative of said discharge start time and a second control signal indicative of said discharge stop time; and
   a high voltage generator responsive to said first control signal from said control circuit for generating a high voltage to continuously discharge said spark plug from said discharge start time to said discharge stop time, wherein when an opening of said throttle valve is smaller than a predetermined value said discharge start time is advanced in angle with an increase in a negative pressure in said intake pipe and retarded in angle with an increase in a rotational speed of said engine, and when said throttle valve opening is greater than said predetermined value said discharge start time is advanced in angle with an increase in said intake pipe negative pressure and also with an increase in said engine rotational speed.

2. An ignition system for an engine having a throttle valve, and intake pipe and at least one spark plug comprising:

crank angle sensor means for detecting the crank angle of said engine and generating a crank angle signal indicative thereof;

engine condition sensor means for detecting at least one operating condition of said engine and generating an engine condition signal indicative thereof;

a control circuit responsive to said crank angle signal and to said engine condition signal for determining a spark plug discharge start time and for setting a spark plug discharge stop time corresponding to a predetermined crank angle, said control circuit generating a control signal indicative of discharge start time and discharge stop time; and a high voltage generator responsive to said control signal for generating a high voltage for continuously discharging said spark plug from said spark plug discharge start time to said spark plug discharge stop time, said control circuit including means responsive to said throttle valve being open less than a first predetermined amount for retarding the crank angle of said discharge start time as a function of increasing rotational speed of said engine.

3. An ignition system for an engine having a throttle valve, an intake pipe and at least one spark plug comprising:

a crank angle sensor for detecting the crank angle of said engine and generating a crank angle signal indicative thereof;

a pressure sensor for detecting the pressure at said intake pipe and generating a pressure signal indicative thereof;

a rotational speed sensor for sensing the rotational speed of said engine and generating a rotational speed signal indicative thereof;

a throttle sensor for sensing the amount said throttle is open and generating a throttle signal indicative thereof;

a control circuit responsive to said crank angle signal, pressure signal, rotational speed signal and throttle signal for determining a spark plug discharge start time as a function of crank angle and for setting a spark plug discharge stop time as a function of crank angle, said control circuit including:

means responsive to said throttle signal for generating a throttle crank angle signal;

means responsive to said pressure signal for generating a pressure crank angle signal;

means responsive to said rotational speed signal for generating a rotational speed crank angle signal;

means for (a) adding said throttle crank angle signal, rotational speed crank angle signal and pressure crank angle signal, and (b) providing a start crank angle signal indicating the spark plug discharge start time;

means for generating a discharge stop angle signal;

means responsive to said discharge start crank angle signal and said discharge stop crank angle signal for generating a composite signal indicating the discharge start time and discharge stop time as a function of crank angle; and a high voltage generator responsive to said composite signal for generating a high voltage to continuously discharge said spark plug from said discharge start time to said discharge stop time.

4. An ignition system according to claim 1, wherein said discharge start time as a function of crank angle is given by the following equation $$\theta_s = aN + bV + c(1-T) + d$$

where $\theta_s$ = discharge start time in terms of crank angle degrees before top dead (BTDC) center on a compression stroke of said engine N = engine rotational speed (rpm)

V = intake pipe negative pressure (mmHg)

T = throttle valve opening, and a,b,c,d = positive constants.

5. An ignition system according to claim 1, wherein said discharge start time is controlled to vary as a step function to assume a predetermined numerical value corresponding to a predetermined range of engine rotational speeds and intake pipe negative pressure, respectively.

6. An ignition system according to claim 1, wherein said high voltage generator comprises:

an oscillator;

first and second AND circuits each having two inputs, one input of which is connected respectively directly and through an inverter to the output of the oscillator and the other input of which is connected to said control circuit in common;

first and second transistors each having a base and a collector electrode, the bases of which are respectively connected to the output of said first and second AND circuits;

a transformer having a primary coil and a secondary coil, a turns ratio of which is approximately 100:1, both ends of the primary coil being connected to the collector electrode of said first and second transistors through a diode and a center terminal thereof being supplied with a d.c. power supply.

7. An ignition system according to claim 6 wherein said oscillator has a frequency of approximately 10 kHz.

8. An ignition system according to claim 5 wherein said step function assumes one of a plurality of possible values, each such value corresponding to one of a plurality of ranges of engine rotational speeds and one of a plurality of ranges of intake pipe negative pressure.

9. An ignition system according to claim 2 wherein said control circuit further includes means responsive to said throttle valve being open less than a first predetermined amount for advancing the crank angle of said discharge start time as a function of increasing negative pressure in said intake pipe.

10. An ignition system according to claim 12 wherein said high voltage generator comprises:

an oscillator;

first and second AND circuits each having two inputs, one input of each of said AND circuits coupled to said composite signal from said control circuit, the second input of said first AND circuit coupled to said oscillator;

an inverter coupling the second input of said second AND circuit to said oscillator;

first and second transistors, each having a base and collector electrode, the bases of said transistors coupled respectively to the outputs of said first and second AND circuits; and a transformer having a primary coil, the ends of which are coupled respectively to the collectors of said transistors and having a center tap coupled to a DC power source, the secondary coil being coupled to said spark plug for providing discharge power thereto.

* * * * *